(12) United States Patent
Hong

(10) Patent No.: US 11,843,406 B2
(45) Date of Patent: *Dec. 12, 2023

(54) APPARATUS, SYSTEMS, AND METHODS FOR SELECTING A WIRELESS DEVICE ANTENNA FOR COMMUNICATION

(71) Applicant: Cypress Semiconductor Corporation, San Jose, CA (US)

(72) Inventor: David Hong, Irvine, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/959,489

(22) Filed: Oct. 4, 2022

(65) Prior Publication Data
US 2023/0055594 A1    Feb. 23, 2023

Related U.S. Application Data

(63) Continuation of application No. 16/436,629, filed on Jun. 10, 2019, now Pat. No. 11,469,783.

(60) Provisional application No. 62/847,726, filed on May 14, 2019.

(51) Int. Cl.
*H04B 1/10* (2006.01)
*H04B 17/318* (2015.01)
*H04W 84/12* (2009.01)

(52) U.S. Cl.
CPC ......... *H04B 1/1027* (2013.01); *H04B 17/318* (2015.01); *H04W 84/12* (2013.01)

(58) Field of Classification Search
CPC .................................................. H04B 1/1027
See application file for complete search history.

(56) References Cited

U.S. PATENT DOCUMENTS

| 7,623,836 B1 * | 11/2009 | Finkelstein | ......... H04L 27/2647 |
| | | | 455/278.1 |
| 11,469,783 B2 * | 10/2022 | Hong | ................... H04B 1/1027 |
| 2013/0040671 A1 * | 2/2013 | Zawaideh | ............. H04W 88/06 |
| | | | 455/500 |
| 2019/0304472 A1 * | 10/2019 | Pendyala | ................. G06N 7/01 |

\* cited by examiner

*Primary Examiner* — Edan Orgad
*Assistant Examiner* — Won Tae C Kim

(57) ABSTRACT

Example systems and methods of a wireless device use a signal attribute detector to determine a signal attribute value associated with a first frame received via a first antenna. Media access control (MAC) logic can detect that the first frame indicates an acknowledgement (ACK) of a second frame transmitted by the wireless device. Responsive to the detection of the ACK by the MAC logic, an antenna evaluator uses the signal attribute value to select one of the first antenna and the second antenna to transmit or receive a third frame.

15 Claims, 7 Drawing Sheets

APPARATUS, SYSTEMS, AND METHODS FOR SELECTING A WIRELESS DEVICE ANTENNA FOR COMMUNICATION

RELATED APPLICATIONS

This application is a Continuation of U.S. patent application Ser. No. 16/436,629, filed Jun. 10, 2019, which claims the benefit of U.S. Provisional Application No. 62/847,726, filed May 14, 2019, which are incorporated herein by reference in their entirety.

TECHNICAL FIELD

The subject matter relates to the field of wireless communications. More specifically, but not by way of limitation, the subject matter discloses techniques for selecting an antenna for communication.

BACKGROUND

Some communication systems include communication circuitry and multiple antennas to transfer data in accordance with one or more wireless communications protocols. For example, a communication system may utilize a Wireless Local Area Network (WLAN) communication protocol (e.g., Wi-Fi based on IEEE 802.11 standards), Bluetooth/Bluetooth Low Energy (BT) communication protocols (e.g., based on BT SIG standards), and/or Zigbee (ZB) communication protocol (e.g., based on IEEE 802.15.4 standards). The link quality supported by a communication system's available antennas can vary in time and depends on a variety of factors including use case, positioning, and environmental conditions.

BRIEF DESCRIPTION OF THE DRAWINGS

Some embodiments are illustrated by way of example and not limitation in the figures of the accompanying drawings in which.

DETAILED DESCRIPTION

Figure 1:
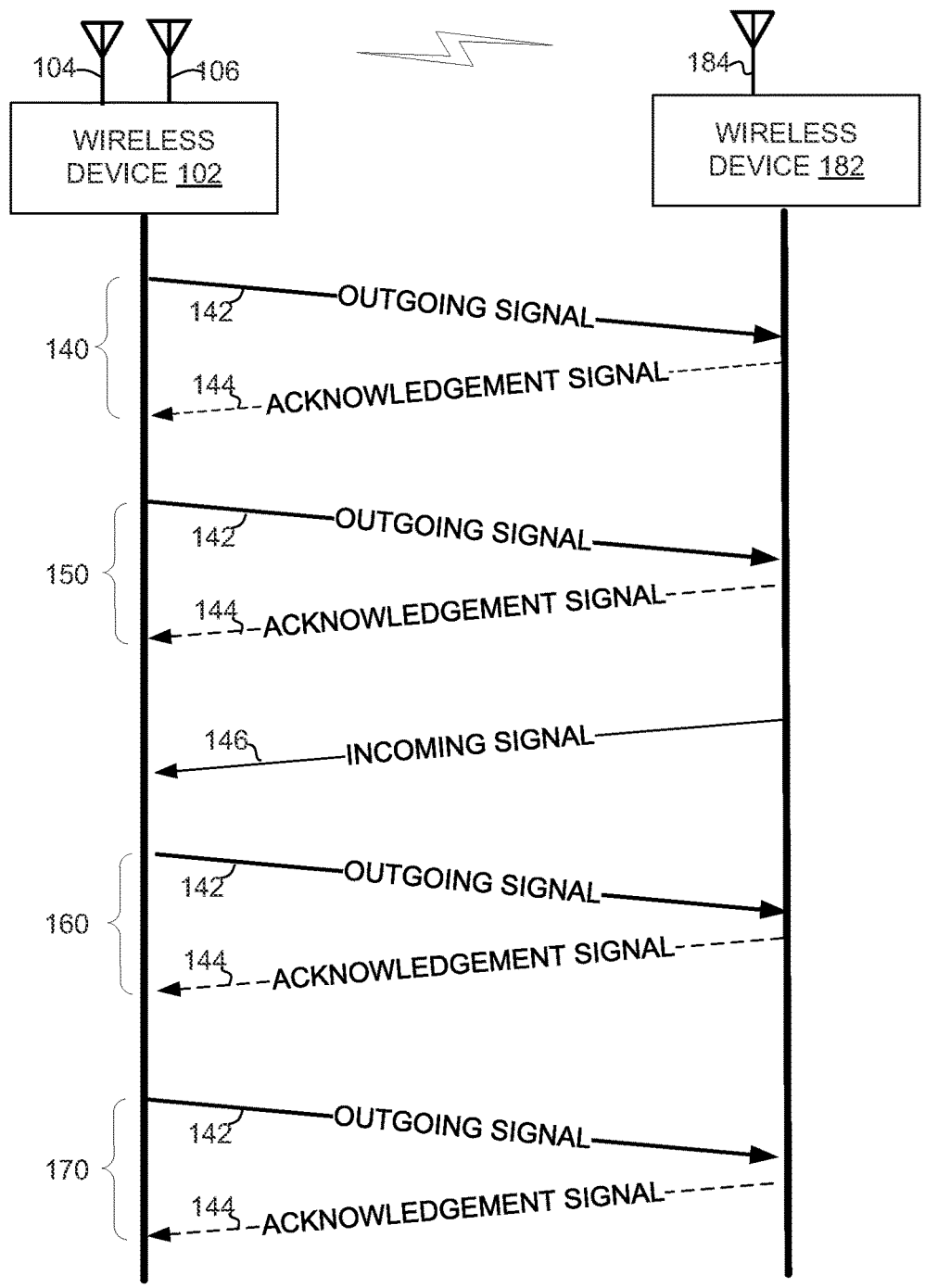
FIG. 1 is a communication flow diagram illustrating communication between wireless devices, in accordance with embodiments.

Apparatus, systems and methods for selecting a wireless device antenna are described. In the following description, for purposes of explanation, numerous examples and embodiments are set forth in order to provide a thorough understanding of the claimed subject matter. It will be evident to one skilled in the art that the claimed subject matter may be practiced in other embodiments. Some embodiments are now briefly introduced and then discussed in more detail along with other embodiments beginning with FIG. 1.

A wireless device may use different antennas (or subsets of antennas) to communicate during different periods of time. Conventionally, a wireless device's antenna selection algorithm may alternate antennas based on a duty cycle and/or select the antenna based on signal attributes associated with an antenna. A signal attribute is a characteristic of a radio frequency (RF) signal received at an antenna.

Existing wireless devices do not provide techniques to detect and utilize signal attributes that can be used for antenna selection. For example, some wireless devices may only use Received Signal Strength Indicator (RSSIs) determined from WLAN beacon packets and/or data packets to select an antenna. With the emergence of some wireless device applications or operational modes, the number of beacon packets and/or data packets received by the wireless device has become insufficient, resulting in the problem of selection by the antenna selection algorithm, of a less-optimal antenna. For example, a conventional wireless security camera's primary operational mode may be to transmit video data (e.g., User Datagram Protocol (UPD) packets) and the wireless security camera may select the antenna for transmission based on RSSI values. When the wireless security camera receives an insufficient number of beacons and/or data packets, the wireless security camera may remain stuck transmitting from a bad antenna leading to packet errors and the increased power consumption required for retransmissions.

Embodiments described herein provide techniques to expand the number of signal attributes samples utilized by a wireless device to select an antenna that is more likely, compared to previous implementations, to support a link quality sufficient to maintain targeted throughput and data rates. For example, an embodiment includes a wireless device coupled to an antenna selector, a first antenna, and a second antenna. The wireless device includes a signal attribute detector to determine an RSSI value associated with a first frame received via the first antenna. In embodiments, media access control (MAC) logic of the wireless device detects that the first frame indicates an acknowledgment (ACK) of a second frame (e.g., a video packet) that was previously transmitted by the wireless device. In various embodiments, the first and second frames are WLAN frames and the MAC logic is configured to detect the ACK based on one or more bit values in a header of the first frame. Responsive to the detection of the ACK by the MAC logic, an antenna evaluator (e.g., an antenna selection algorithm) of the wireless device uses the RSSI value to select one of the first antenna and the second antenna, via the antenna selector, to transmit or receive a third frame (e.g., to transmit a subsequent video packet).

In embodiments, the antenna evaluator uses the RSSI value to generate or update a signal quality value (e.g., a signal-to-noise ratio (SNR)) associated with the first antenna during a period of time. Dynamic selection of the antenna with an acceptable or comparable larger SNR can result in better overall link quality. To select between the first antenna and the second antenna, the antenna evaluator may compare the SNR value associated with the first antenna to a reference SNR value. The reference SNR value may be an SNR value associated with the second antenna (e.g., a historical SNR based on signals received via the second antenna) or a threshold SNR value (e.g., a minimum SNR value).

In this way, embodiments can utilize signal attributes that were conventionally undetermined, unused and/or discarded (e.g., RSSI values associated with MAC ACKS) to enhance signal quality associated with an antenna. Although some embodiments are described with respect to WLAN communication protocol, other embodiments may be based on other communication protocols such as ZB or BT communication protocols, without departing from the claimed subject matter.

The detailed description below includes references to the accompanying drawings, which form a part of the detailed description. The drawings show illustrations in accordance with embodiments. These embodiments, which are also referred to herein as "examples," are described in enough detail to enable those skilled in the art to practice embodiments of the claimed subject matter. The embodiments may be combined, other embodiments may be utilized, or structural, logical, and electrical changes may be made without departing from the scope of what is claimed. The following detailed description is, therefore, not to be taken in a limiting sense, and the scope is defined by the appended claims and their equivalents.

FIG. 1 is a block diagram illustrating communication between wireless device 102 and wireless device 182, in accordance with embodiments. The wireless devices 102 and 182 may communicate using one or more communication protocols including without limitation, WLAN, BT, or ZB. In various embodiments, the wireless devices 102 and 182 may be included in a speaker, a web camera, a voice controlled hub, a mobile phone, an access point, or any other device that is capable of wirelessly communicating.

The wireless device 102 is shown to include antennas 104 and 106 while the wireless device 182 is shown to include the antenna 184. In some embodiments, the antennas 104 and 106 may each represent a group of one or more antennas. An antenna or group of antennas that can support sufficient link quality may vary based on a variety of factors including current positioning of the wireless device 102 relative to the wireless device 182 and other environmental conditions such as interference, noise, and the like. In embodiments, the wireless device 102 can utilize ACK signals to select which of its multiple antennas 104 or 106 to use for communication with the wireless device 182.

As shown, the wireless device 102 transmits an outgoing signal 142 to the wireless device 182 and receives an acknowledgement signal 144 thereafter. For example, the outgoing signal 142 may comprise a data packet or frame (e.g., video data, audio data, status data, or any other data) that the wireless device 102 may re-transmit if acknowledgement by the wireless device 182 is not received. In response to receiving the outgoing signal 142, the communication device 182 transmits an acknowledgement signal 144 that acknowledges the receipt of the outgoing signal 142 by the wireless device 182. In embodiments, the acknowledgement signal 144 may be any RF signal that includes an indication that it is in response to the outgoing signal 142. For WLAN and ZB communications, the acknowledgement may be indicated in a MAC ACK frame. For BT communications, the acknowledgement may be indicated in a baseband packet header. Multiple outgoing signal-acknowledgement pairs 140, 150, 160, and 170 are shown to be communicated between the wireless device 102 and the wireless device 182.

The wireless device 102 is also shown to receive an incoming signal 146 from the wireless device 182. The incoming signal 146 may include data or beacons or any other packet or frame that does not explicitly serve as an acknowledgement signal 144 to an outgoing signal 142.

In embodiments, the wireless device 102 has an antenna evaluator (not shown) to determine which antenna 104 or 106 to use, for link quality purposes, for communication. Conventionally, systems were capable of using RSSI values associated with the incoming signal 146 (e.g., WLAN data frames and beacon frames) to inform antenna selection (e.g., but not capable of obtaining and using any RSSI values associated with acknowledgement signals 144). This resulted in the problem of selecting an antenna that yields comparatively lower link quality than another available antenna could have provided. The wireless device 102 may include the communication device described with respect to FIG. 2, which can use signal attributes of each acknowledgement signal 144 to dynamically select among available antennas to provide acceptable link quality.

Figure 2:
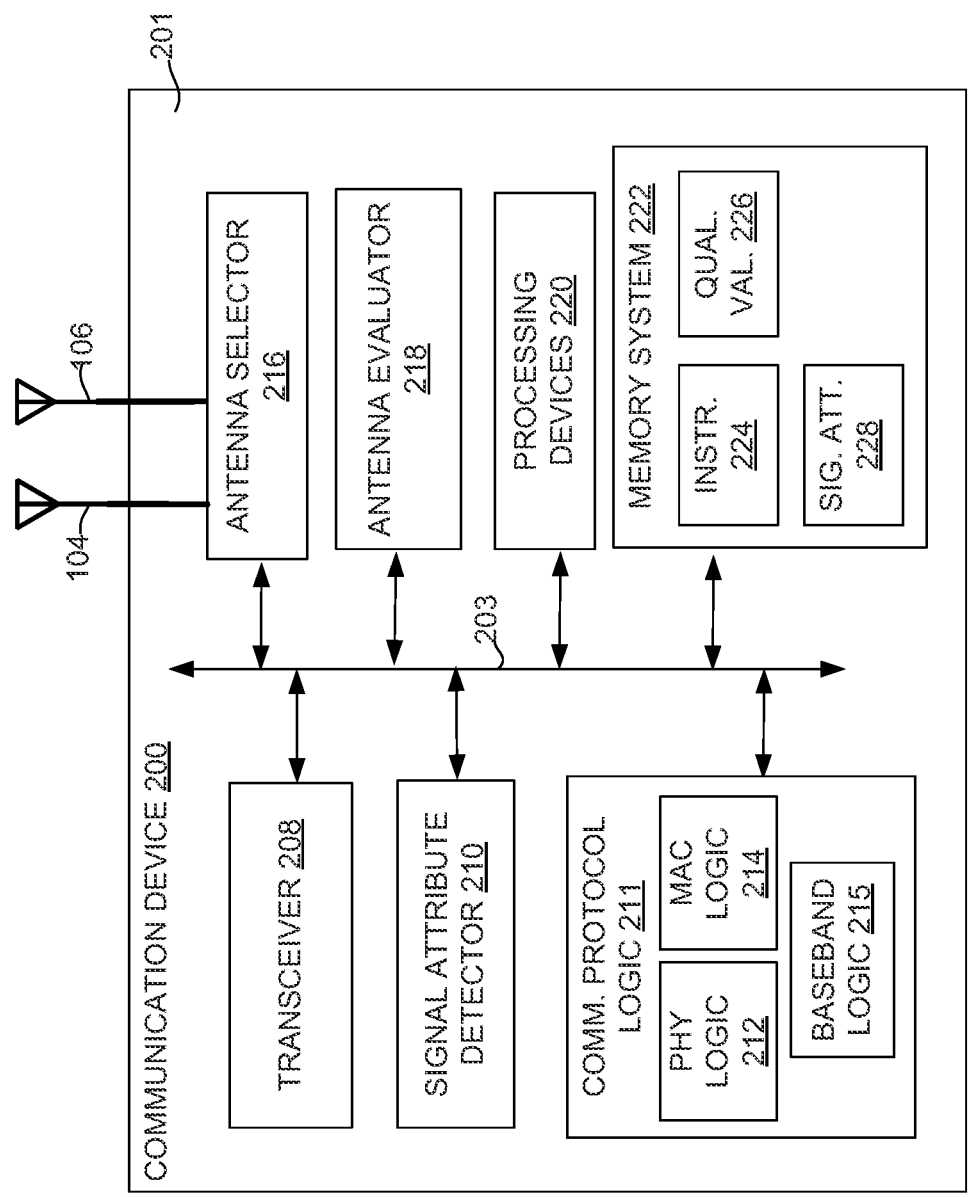
FIG. 2 is a block diagram illustrating a communication device, in accordance with embodiments.

FIG. 2 is a block diagram illustrating a communication device 200, in accordance with embodiments. The communication device 200 may be disposed on a substrate 201 such as a printed circuit board (PCB). The bus system 203 may include inter-chip busses, intra-chip busses, coexistence busses, or any other communication line to connect the circuits and/or logic blocks, which may be disposed on an IC chip or discrete IC chips.

In embodiments, collaborative coexistence hardware mechanisms and algorithms enable communication subsystems to operate concurrently and/or simultaneously. For example, the communication device 200 may be included on a system on a chip that includes BT communication resources and/or ZB communication resources coupled via coexistence interface(s) to WLAN communication resources.

Collaborative coexistence techniques provide a methodology by which communication resources for multiple communication protocols can be collocated on a device (e.g., a small form-factor device). Coexistence solutions can be implemented at the chip level, the board level, the software level (e.g., firmware), and/or through antennas. In an embodiment, collaborative coexistence between WLAN, BT, and/or ZB subsystems may be implemented by Packet Traffic Arbitration (PTA) logic (not shown) using PTA's prioritization approaches between data types and applications and/or other arbitration algorithms to pursue optimum performance for the particular circumstances and design constraints of a multi-network communication system. Through PTA embodiments, overall quality for simultaneous voice, video, and data transmission on an embedded system can be achieved. In some embodiments, an antenna that is selected according to the embodiments described herein may be shared for communication by one or more of the multiple communication resources supported by a wireless device.

The communication device 200 is shown to include transceiver 208, signal attribute detector 210, communication protocol logic 211, antenna selector 216, antenna evaluator 218, processing devices 220, and memory system 222, which are each discussed in more detail below.

Communication device 200 may include or be coupled to antennas 104 and 106 through antenna selector 216, which may include any selection logic (e.g., hardware, software, or combination) known in the art. When the antenna selector 216 selects an antenna, it couples the antenna to the transceiver for RF signal reception and transmission. In embodiments, a dwell period is a period of time that an antenna remains coupled to transceiver 208 via the antenna selector

216. In embodiments, each antenna 104 and 106 can represent one or more antennas. For example, in some embodiments, the antenna selector 216 (e.g., operating as switch circuitry) may couple the communication device 200 to one or more antenna arrays (e.g., a phased array) and/or antenna clusters including any number of antennae (e.g., six or eight) exclusively paired with or shared among communication protocol logic 211.

The transceiver 208 may be coupled with antennas 104 and/or 106 via antenna selector 216 and facilitates transmitting and receiving of RF signals according to one or more communication protocols. In embodiments, when operating as a receiver, the transceiver 208 processes received RF signals in the analog domain, digitizes them, and demodulates corresponding digital data to provide a decoded sequence of 1s and 0s to the communication protocol logic 211 for further processing (e.g., packet processing). When operating as a transmitter, the transceiver 208 generally performs the operations in reverse, receiving a sequence of 1s and 0s from the communication protocol logic 211, modulating the signal, and outputting an analog signal for transmission by one or more of the antennas 104 and 106.

The signal attribute detector 210 is operably coupled to one or more of the antennas 104 and 106 to detect and provide signal attributes for use by the antenna evaluator 218 in selecting an antenna that facilitates acceptable link quality. In some embodiments, the signal attribute detector 210 may include analog and/or digital logic and/or measurement circuitry to determine or estimate attributes associated with RF signals. Although shown as being a separate block, the signal attribute detector 210 may be implemented in whole or in part by the transceiver 208, communication protocol logic 211, and/or by processing instructions 224 stored in the memory system 222.

Signal attributes associated with RF signals may include, without limitation, signal frequency, angular frequency, amplitude, phase, wavelength, wave speed, time of arrival, time difference of arrival, phase difference, phase difference of arrival, signal level and/or strength values (e.g., RSSI value), signal quality values (e.g., SNR or an exponential effective SNR mapping (EESM) value), signal-to-interference-plus-noise ratio (SINR), packet delivery ratio (PDR), and/or bit error rate (BER) and/or any other attribute combinations or derivatives thereof. SINR represents the extent to which the power of the received signal exceeds the sum of noise plus interference at the transceiver. PDR is the ratio of the correctly received packets at the receiver to the total number of packets sent by the sender. BER is the ratio of bits with errors to the total number of bits that have been received over a given time period. In embodiments, a model may be used to map the SINR to the BER or the PER in presence, for example, of white noise or fading. One or more of these signal attributes may provide an average estimation of the link quality over a period of time.

In some embodiments, the signal attribute detector 210 uses techniques known in the art to detect an RSSI value associated with an RF signal observed at an antenna during reception of a packet's (e.g., or frame's) preamble. The signal attribute detector 210 may encode the detected RSSI value in a header of the same packet and/or store the RSSI value (e.g., in the signal attributes table 228) in the memory system 222.

The communication protocol logic 211 includes the instructions and hardware to support communication protocols defined by one or more communication protocol standards (e.g., according to WLAN, BT, and/or ZB communication protocols). The PHY logic 212 may include dedicated circuitry and/or processor executed instructions to implement all or portions of electrical and physical specifications of a communication protocol and defines the relationship between the communication device and the transmission medium (e.g., all or portions of the physical layer of the OSI reference model). For example, the PHY logic 212 may establish and terminate connections, provide contention resolution and flow control, and provide modulation, demodulation, and/or conversion between digital data and corresponding wirelessly communicated signals. The MAC logic 214 may include dedicated circuitry and/or processor executed instructions (e.g., control logic) to implement all or portions of the functional and procedural means to transfer data between network entities (e.g., all or portions of the data link layer of the OSI reference model). The MAC logic 214 may inspect frames fields for ACK indications to detect and possibly correct errors that may occur in the physical layer. In addition, the MAC logic 214 may store signal attributes associated with frames including ACK indications.

Alternatively or additionally, the communication protocol logic 211 may include baseband logic 215 that includes dedicated circuitry and/or processor executed instructions to manage physical channels and links and other services like error correction, data whitening, hop selection and security according to BT communication protocol standards. The baseband logic 215 may include a link controller that works with a BT link manager (not shown) in upper BT protocol layers to carry out link level routines like link connection and power control. The baseband logic 215 may also manage asynchronous and synchronous links, handle packets and do paging and inquiry to access and inquire BT devices in the area. In embodiments, the baseband logic 215 may inspect packet fields for ACK indications to detect and possibly correct errors and then store signal attributes associated with frames including the ACK indications.

In embodiments, the processing devices 220 are used to implement communication device 200 operations utilizing instructions 224 (e.g., firmware or microcode) and/or data structures organized within the memory system 222. Although shown as single blocks, processing devices 220 and memory systems 222 may include multiple shared or dedicated resources distributed among the various blocks (e.g., 208, 210, 211, 216, 218) of the communication device 200. Example processing devices 220 and memory systems are described in more detail with respect to FIG. 7.

The antenna evaluator 218 is to generate signal or link quality values associated with an antenna based on signal attributes values associated with that antenna and store them in the memory system 222. Signal or link quality values associated with an antenna may include, without limitation, SNR, SINR, PDR, BER, or any other metric that indicates a quality of wireless communication. The antenna evaluator 218 may be implemented by dedicated hardware and/or by processing instructions 224. In embodiments, the antenna evaluator 218 may base antenna selection on comparing a signal quality value (e.g., in quality value tables 226) associated with a currently selected antenna with a reference signal quality value (e.g., in quality value tables 226), such as a threshold quality value or a historical signal quality value associated with a previously selected antenna. Example operations of the antenna evaluator 218 are described in more detail with respect to FIGS. 3, 4, and 7. Although the examples are explained with respect WLAN embodiments, BT and/or ZB embodiments may equally be employed without departing from the claimed subject matter.

Figure 3:
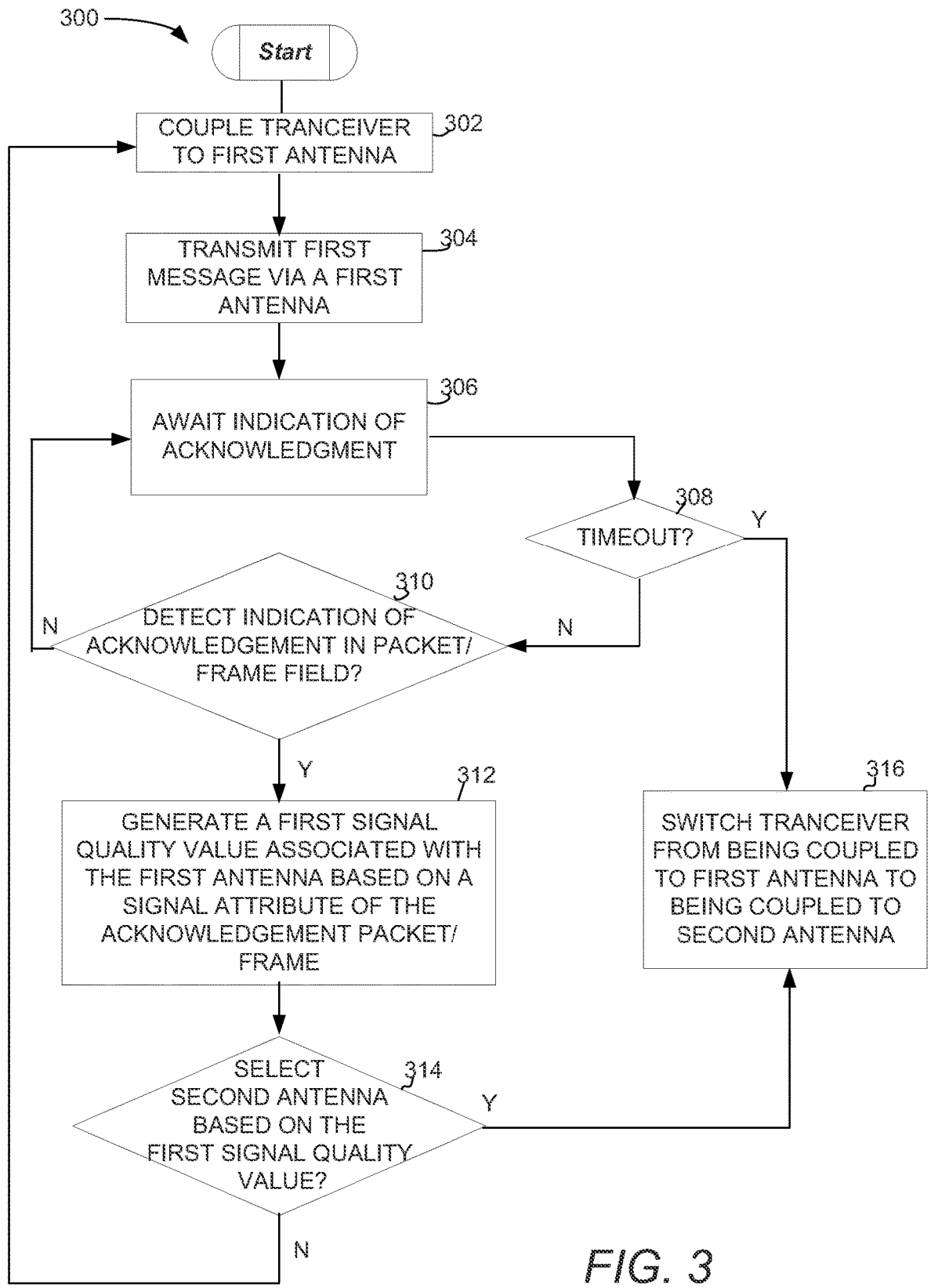
FIG. 3 is a flow diagram illustrating a method of selecting an antenna based on an indication of acknowledgement, in accordance with embodiments.

FIG. 3 is a flow diagram illustrating a method 300 of selecting an antenna based on an acknowledgment (e.g., a MAC or baseband ACK), in accordance with embodiments. The method 300 can be performed by processing logic comprising hardware (circuitry, dedicated logic, etc.), software (such as is run on a general-purpose computing system or a dedicated machine), firmware (embedded software), or any combination thereof. In various embodiments, the method 300 may be performed as shown and described with respect to the wireless device 102 of FIG. 1 and the communication device 200 of FIG. 2.

At block 302, the antenna selector 216 couples the transceiver 208 to the antenna 104. At block 304, transceiver 208 transmits a first signal (e.g., outgoing signal 142) via the antenna 104. At block 306, the MAC logic 214 awaits acknowledgement of the transmitted first signal. At block 308, if the MAC logic 214 determines that a timeout period has elapsed since the first signal was transmitted, the method 300 proceeds to block 316 where the antenna evaluator 218 causes the antenna selector 216 to switch (e.g., via a switch signal) the transceiver 208 from being coupled to the first antenna 104 to being coupled to the second antenna 106. If at block 308, the MAC logic 214 determines that the timeout period has not elapsed, the method proceeds to block 310. At block 310, if the MAC logic 214 determines that a second signal (e.g., acknowledgement signal 144) acknowledging the first transmitted signal has not been received, the method 300 loops back to block 306 to await acknowledgement of the transmitted first signal. If at block 310, the MAC logic 214 determines that the second signal acknowledging the transmitted first signal has been received, the method proceeds to block 312.

At block 312, the antenna evaluator 218 generates a first signal quality value associated with the first antenna 104, based on a signal attribute of the second signal (e.g., the acknowledgement signal 144) detected by the signal attribute detector 210. At block 314, the antenna evaluator 218 determines whether to select the second antenna 106 based on the first signal quality value generated at block 312. Examples for making the determination of block 314 is described with respect to FIG. 4. If, at block 314, the second antenna 106 is not to be selected, the transceiver 208 remains coupled to the first antenna 104 at block 302. If at block 314, the second antenna 106 is to be selected, the method 300 proceeds to block 316 where the antenna evaluator 218 causes the antenna selector 216 to switch the transceiver 208 from being coupled to the first antenna 104 to being coupled to the second antenna 106.

Figure 4:
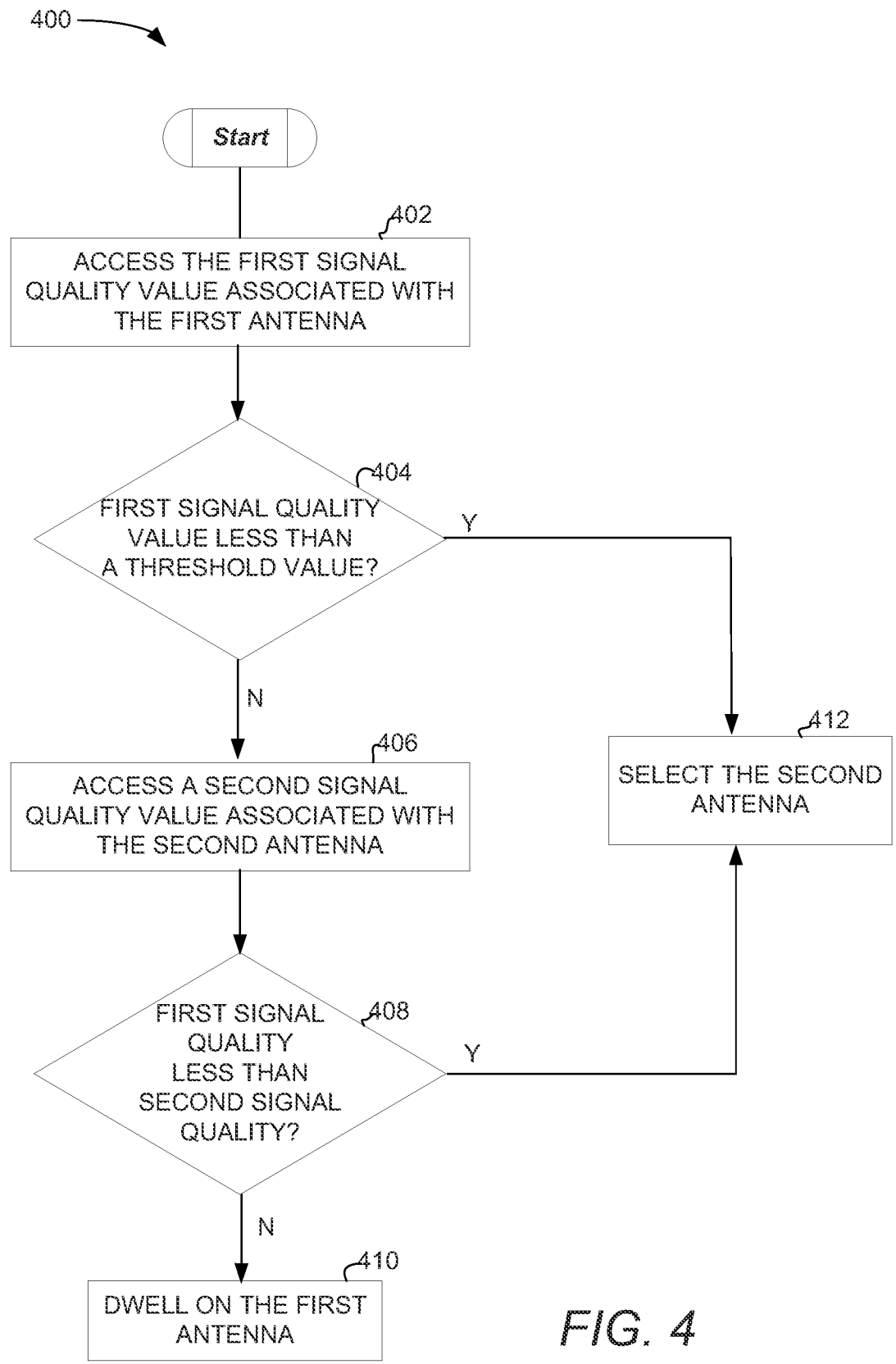
FIG. 4 is a flow diagram illustrating a method of providing an antenna selection determination, in accordance with embodiments.

FIG. 4 is a flow diagram illustrating a method 400 of providing an antenna selection determination, in accordance with embodiments. The method 400 can be performed by processing logic comprising hardware (circuitry, dedicated logic, etc.), software (such as is run on a general-purpose computing system or a dedicated machine), firmware (embedded software), or any combination thereof. In various embodiments, the method 400 may be performed as shown and described with respect to the wireless device 102 of FIG. 1 and the communication device 200 of FIG. 2.

At block 402, the antenna evaluator 218 accesses the first signal quality value (e.g. stored in the quality value tables 226) associated with the first antenna 104. At block 404, if the first signal quality value is less than a threshold signal quality value (e.g., stored in the quality value tables 226), the antenna evaluator 218 causes the antenna selector 216 to select the second antenna 106 at block 410. If the first signal quality value is not less than the signal threshold value, the method 400 proceeds to block 406. At block 406, the antenna evaluator accesses a second signal quality value (e.g., stored in the quality value tables 226) associated with the second antenna 106.

At block 408, if the first signal quality value is greater than or equal to (e.g., not less than) the second signal quality value, the antenna evaluator 218 causes the antenna selector 216 to dwell on the first antenna 104 at block 410. If the first signal quality value is less than the second signal quality value, the antenna evaluator 218 causes the antenna selector 216 to select the second antenna 106 at block 412. Example WLAN frames and BT packets utilized in embodiments are described with respect to FIGS. 5 and 6.

Figure 5:
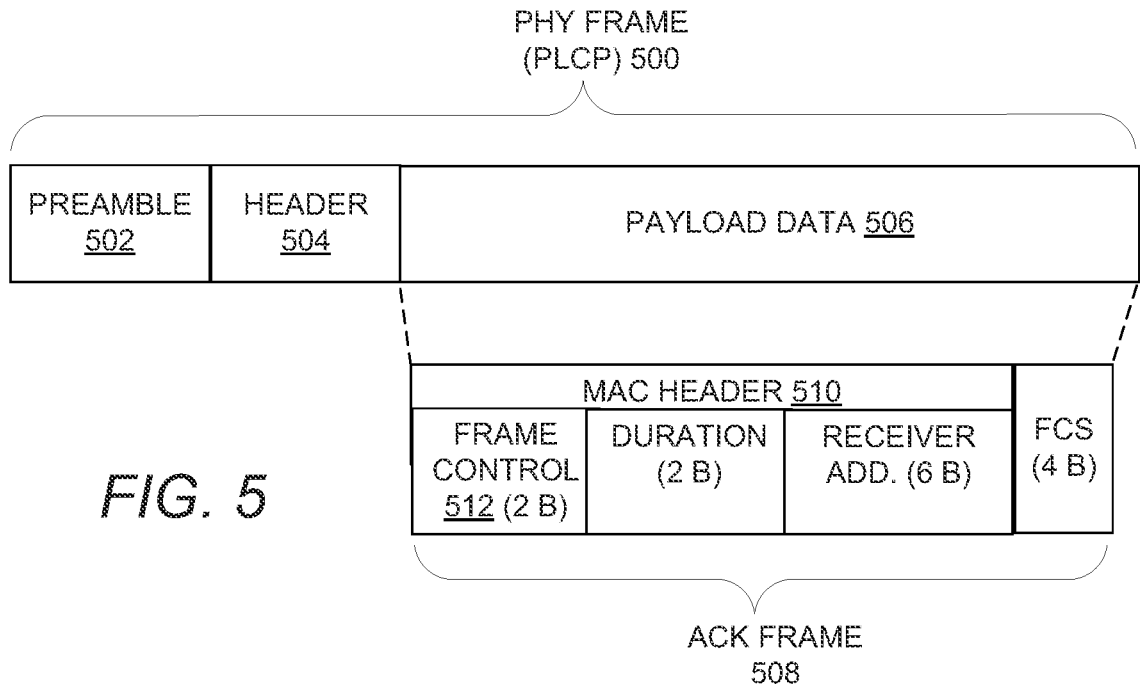
FIG. 5 is a physical layer frame format diagram, in accordance with embodiments.

FIG. 5 is a PHY frame diagram 500 including a MAC ACK indication, in accordance with embodiments. In embodiments, the PHY frame 500 is in accordance with the physical layer convergence protocol (PLCP). The PHY frame is shown to include a preamble 502, a header 504, and payload data 506. In embodiments, the signal attribute detector 210 uses a sequence of bit values in the PHY preamble 502 to determine the RSSI associated with the PHY frame 500. In embodiments, the signal attribute detector 210 places the calculated RSSI value in the PHY header 504 for later use by the MAC logic 214 and the antenna evaluator 218. The payload data 506 of the PHY frame 500 is shown to include a MAC header 510 including an ACK frame 508 as indicated by bits (e.g., having a value 1101) in the frame control field 512.

In embodiments, the MAC logic 214 examines the bit values of the frame control field 512 to determine a type and subtype of the frame. In general, a frame type could be a management frame, a control frame, or a data frame. Data frames carry higher-level protocol data in the frame body. Management frames facilitate the maintenance of communication. Example subtypes of management frames may include beacon frames, which are sent periodically from an access point to announce its presence and provide the service set identifier, and other parameters for devices within range. Control frames facilitate in the exchange of data frames between stations. Example subtypes of a control frame may include ACK frames sent by a receiving station (e.g., the wireless device 182 of FIG. 1) after receiving a data frame if no errors are found. In embodiments, if the sending station (e.g., the wireless device 102 of FIG. 2) does not receive an ACK frame within a predetermined period of time, the sending station may switch antennas and resend the data frame.

Figure 6:
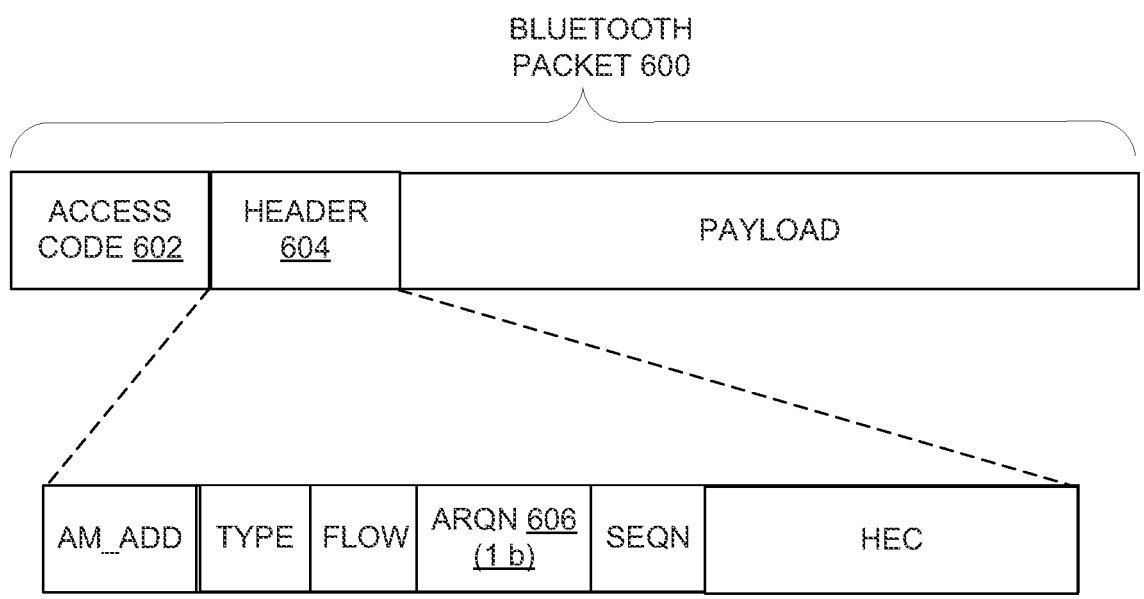
FIG. 6 is a Bluetooth packet format diagram, in accordance with embodiments.

FIG. 6 is a packet diagram illustrating a BT packet 600 with an ACK indication, in accordance with an embodiment. The signal attribute detector 210 of FIG. 2 may use a sequence of bits in the access code field 602 to determine an RSSI value associated with the BT packet 600 before storing the signal attribute value in the memory system 222 or encoding it in bits of the header field 604 for later use by the baseband logic 215 and the antenna evaluator 218. In embodiments, the baseband logic 215 can determine whether the BT packet 600 includes an ACK indication based on the value of a bit (e.g. 0 or 1 value) of the ARQN field 606 in the header 604.

Figure 7:
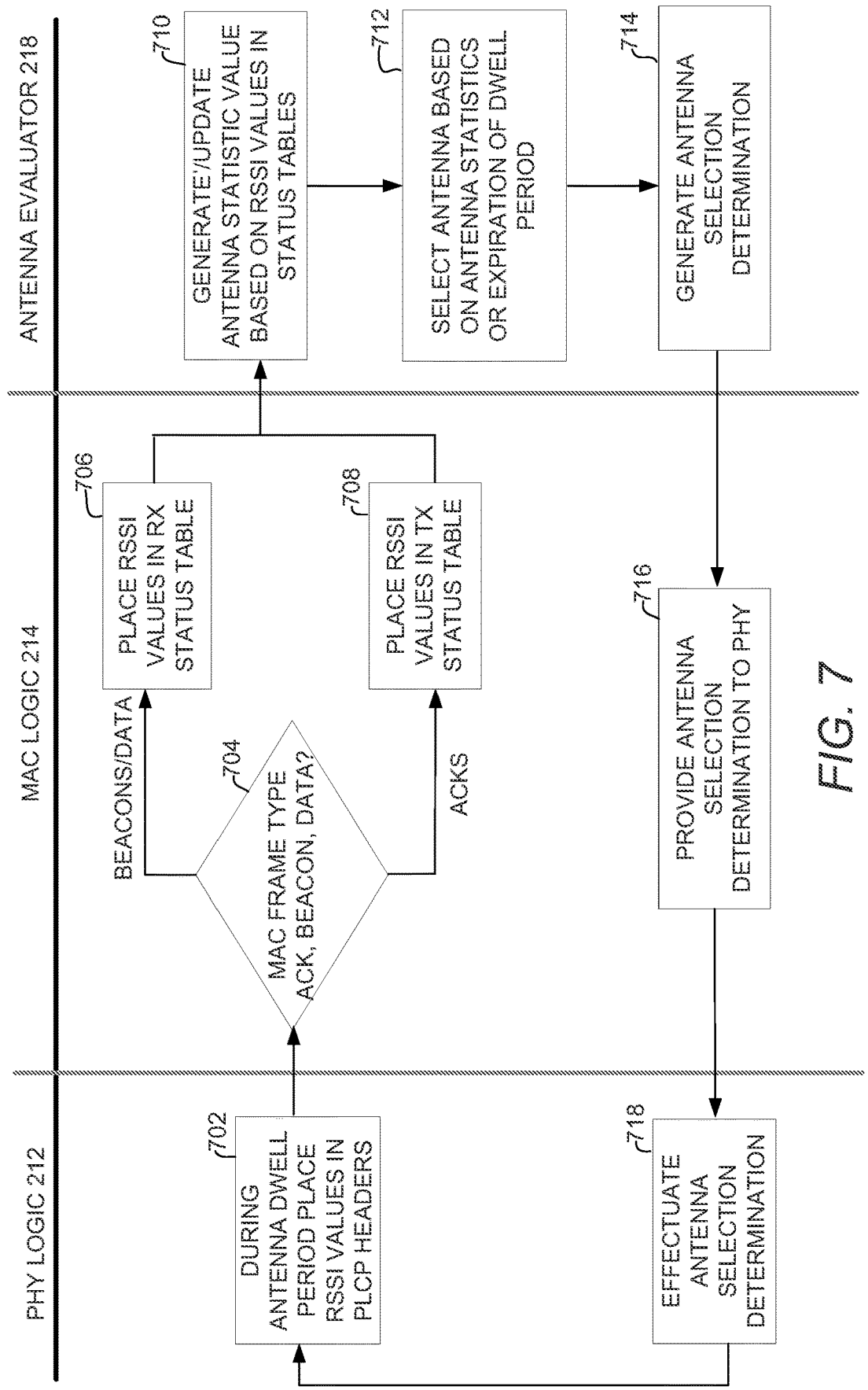
FIG. 7 is a flow diagram illustrating a method of selecting an antenna based on an acknowledgement frame, in accordance with embodiments.

FIG. 7 is flow diagram illustrating antenna selection by a WLAN communication device, in accordance with embodiments. The flow can be performed by processing logic comprising hardware (circuitry, dedicated logic, etc.), software (such as is run on a general-purpose computing system or a dedicated machine), firmware (embedded software), or any combination thereof. In various embodiments, the flow may be performed as shown and described with respect to the PHY logic 212, the MAC logic 214, and the antenna evaluator 218 of the communication device 102 as described with respect to FIG. 2 and with reference to the PLCP frame of FIG. 5. In embodiments, the process is performed on a plurality of frames received through a currently selected antennas during a dwell period.

At block 702, during an antenna dwell period, the PHY logic 212 places the RSSI value (e.g., as bit values) calculated for each received PHY frame 500 in the corresponding PHY header 504. At block 704, the MAC logic 214 examines bits in the frame control field 512 of the MAC header 510 to determine whether the frame is an ACK frame 508, a beacon, or a data frame. If the frame control field 512 indicates a beacon or data type frame, at block 706, the MAC logic 214 places the RSSI value (e.g., that is encoded the PLCP header 504) in a receive status table of the signal attribute table 228 or other data structure (e.g., as PHY-RXSTATUS). If the frame control field 512 indicates the ACK frame 508, at block 708, the MAC logic 214 places the RSSI value (e.g., that is encoded the PLCP header 504) in a transmit status table of the signal attribute table 228 or other data structure (e.g., as PHYTXSTATUS).

At block 710, the antenna evaluator 218 generates and/or updates in the quality value table 226, a signal quality value for the selected antenna based on the RSSI values stored in the receive and transmit status tables for the corresponding dwell period. The generation and/or updating of the signal quality value may be dynamic such that the signal quality value may be a running average SNR value at a point in time during the antenna dwell period. In embodiments, the antenna evaluator 218 calculates the average SNR based on the current average of the RSSI values during the dwell period and a noise level value for the period. For example, the antenna evaluator 218 may calculate the average SNR as a difference in decibels between the current average RSSI value and the noise level value. In embodiments, the noise level value is a noise floor or ambient noise of the RF environment that the antenna evaluator 218 requests the processing device 220 (e.g., PHY logic 212) to measure and/or periodically update in the memory system 222.

At block 712, the antenna evaluator 218 selects an antenna based on the signal quality value or based on the expiration of the dwell period and generates a corresponding antenna selection determination at block 714. For example, the antenna evaluator 218 may generate an antenna selection determination to dynamically cause the transceiver 208 to be switched to being coupled to another antenna if the antenna dwell period has expired or the antenna evaluator determines that the calculated signal quality value does not meet or exceed a reference value. The reference value may be a minimum acceptable SNR value, or an historical average signal quality value associated with antenna that was coupled to the transceiver 208 during a previous dwell period. When the calculated signal quality value does meet or exceed the reference value the antenna selection determination (e.g. or lack thereof) may indicate that the transceiver 208 should remain coupled to the currently selected antenna for the remainder of the dwell period or for an updated dwell period.

At block 716, the MAC logic 214 passes the antenna selection determination down to the PHY logic 212. For example the MAC logic 214 may cause the PHY logic 212 to store antenna selection settings and/or antenna dwell period settings in the memory system 222 (e.g., PHY registers). At block 718, the PHY logic 212 effectuates the antenna selection determination (e.g., based on antenna selection settings and/or antenna dwell periods setting in the memory system 222) and returns the flow back to block 702 to continue the process on the same antenna or a newly selected antenna.

Embodiments may utilize MAC ACKs when operating in TCP mode or UDP mode. TCP mode may be used for connection-oriented transmissions, whereas the UDP mode is typically less complex and used for connectionless messaging transmissions. Compared to UDP mode, the TCP mode can involve a greater number of frames (e.g., TCP ACKS) conventionally used to build receive statistics. Prior to embodiments described herein, the presence of a UDP MAC ACK was used to confirm a successful transmission but not to trigger storage of an associated RSSI value for receive statistics. In UDP mode, there are no upper layer ACKS (e.g. TCP ACKs) used to trigger storage of RSSI values for receive statistics. For example, a wireless security camera that streams video packets to one or more nodes on the Internet (e.g., the "cloud") may operate in UDP mode (e.g., without upper layer ACKs as in TCP) because the wireless security camera may not need to know if a target Internet node has successfully received the video packet. Moreover, having to process more complex upper layer ACKS (e.g., in a TCP mode) can delay security camera footage and/or cause jitter in the playback. As described in embodiments, UDP MAC ACKs are detected and in response, rather than being discarded or ignored, the associated RSSI values are used as receive statistics for antenna selection by an antenna diversity algorithm.

Figure 8:
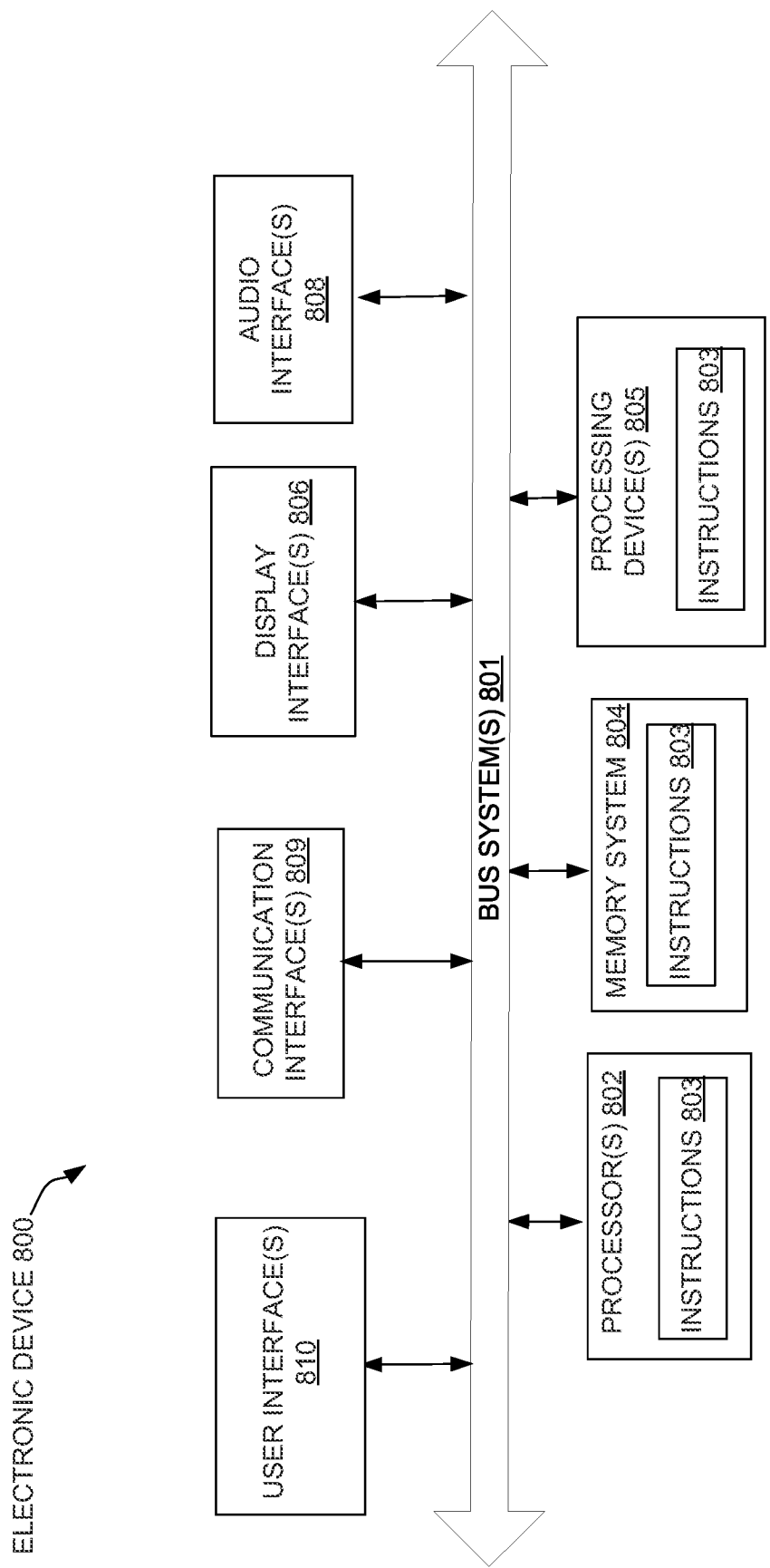
FIG. 8 is a block diagram illustrating an electronic device, in accordance with embodiments.

FIG. 8 is a block diagram illustrating an electronic device 800, in accordance with embodiments. The electronic device 800 may fully or partially include and/or operate the example embodiments of the wireless device 102 or portions thereof as described with respect to FIGS. 1-7. The electronic device 800 may be in the form of a computer system within which sets of instructions may be executed to cause the electronic device 800 to perform any one or more of the methodologies discussed herein. The electronic device 800 may operate as a standalone device or may be connected (e.g., networked) to other machines. In a networked deployment, the electronic device 800 may operate in the capacity of a server or a client machine in server-client network environment, or as a peer machine in a P2P (or distributed) network environment.

The electronic device 800 may be an Internet of Things (IoT) device, a server computer, a client computer, a personal computer (PC), a tablet, a set-top box (STB), a voice controlled hub (VCH), a Personal Digital Assistant (PDA), a mobile telephone, a web appliance, a network router, switch or bridge, a television, speakers, a remote control, a monitor, a handheld multi-media device, a handheld video player, a handheld gaming device, or a control panel, or any other machine capable of executing a set of instructions (sequential or otherwise) that specify actions to be taken by that machine. Further, while only a single electronic device 800 is illustrated, the term "device" shall also be taken to include any collection of machines that individually or jointly execute a set (or multiple sets) of instructions to perform any one or more of the methodologies discussed herein.

The electronic device 800 is shown to include processor(s) 802. In embodiments, the electronic device 800 and/or processors(s) 802 may include processing device(s) 805 such as a System on a Chip processing device, developed by Cypress Semiconductor Corporation, San Jose, California. Alternatively, the electronic device 800 may include one or more other processing devices known by those of ordinary skill in the art, such as a microprocessor or central processing unit, an application processor, a host controller, a controller, special-purpose processor, digital signal processor (DSP), an application specific integrated circuit (ASIC), a field programmable gate array (FPGA), or the like. Bus system 801 may include a communication block (not shown) to communicate with an internal or external component, such as an embedded controller or an application processor, via communication interfaces(s) 809 and/or bus system 801.

Components of the electronic device 800 may reside on a common carrier substrate such as, for example, an IC die substrate, a multi-chip module substrate, or the like. Alternatively, components of the electronic device 800 may be one or more separate ICs and/or discrete components.

The memory system 804 may include volatile memory and/or non-volatile memory which may communicate with one another via the bus system 801. The memory system 804 may include, for example, random access memory (RAM) and program flash. RAM may be static RAM (SRAM), and program flash may be a non-volatile storage, which may be used to store firmware (e.g., control algorithms executable by processor(s) 802 to implement operations described herein). The memory system 804 may include instructions 803 that when executed perform the methods described herein. Portions of the memory system 804 may be dynamically allocated to provide caching, buffering, and/or other memory based functionalities.

The memory system 804 may include a drive unit providing a machine-readable medium on which may be stored one or more sets of instructions 803 (e.g., software) embodying any one or more of the methodologies or functions described herein. The instructions 803 may also reside, completely or at least partially, within the other memory devices of the memory system 804 and/or within the processor(s) 802 during execution thereof by the electronic device 800, which in some embodiments, constitutes machine-readable media. The instructions 803 may further be transmitted or received over a network via the communication interfaces(s) 809.

While a machine-readable medium is in some embodiments a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the example operations described herein. The term "machine-readable medium" shall accordingly be taken to include, but not be limited to, solid-state memories, and optical and magnetic media.

The electronic device 800 is further shown to include display interface(s) 806 (e.g., a liquid crystal display (LCD), touchscreen, a cathode ray tube (CRT), and software and hardware support for display technologies), audio interface(s) 808 (e.g., microphones, speakers and software and hardware support for microphone input/output and speaker input/output). The electronic device 800 is also shown to include user interface(s) 810 (e.g., keyboard, buttons, switches, touchpad, touchscreens, and software and hardware support for user interfaces).

The above description is intended to be illustrative, and not restrictive. For example, the above-described embodiments (or one or more aspects thereof) may be used in combination with each other. Other embodiments will be apparent to those of skill in the art upon reviewing the above description. In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. In the event of inconsistent usages between this document and those documents so incorporated by reference, the usage in the incorporated reference(s) should be considered supplementary to that of this document; for irreconcilable inconsistencies, the usage in this document supersedes the usage in any incorporated references.

Although the claimed subject matter has been described with reference to specific embodiments, it will be evident that various modifications and changes may be made to these embodiments without departing from the broader spirit and scope of what is claimed. Accordingly, the specification and drawings are to be regarded in an illustrative rather than a restrictive sense. The scope of the claims should be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended; a system, device, article, or process that includes elements in addition to those listed after such a term in a claim are still deemed to fall within the scope of that claim. Moreover, in the following claims, the terms "first," "second," and "third," etc. are used merely as labels and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims.

What is claimed is:

1. A wireless device comprising:
a first antenna and a second antenna; and
one or more processing circuits to:
   cause the wireless device to select a first antenna as an active antenna for a first dwell period;
   determine a plurality of signal quality values (SQVs) associated with the first antenna, wherein each of at least a subset of the plurality of SQVs is determined for a respective frame of one or more frames transmitted or received by the wireless device during the first dwell period;
   compute an aggregated SQV based on at least the plurality of SQVs; and
   cause the wireless device to select, responsive to expiration of the first dwell period and using the aggregated SQV, an active antenna for a second dwell period, wherein the active antenna for the second dwell period comprises at least one of the first antenna or a second antenna,
   wherein, to cause the wireless device to select the first antenna as the active antenna for the first dwell period, the one or more processing circuits are to:
      cause the wireless device to transmit a first frame using an antenna different from the first antenna;
      cause the wireless device to receive, responsive to the first frame within a timeout period, a response frame using the antenna different from the first antenna;

determine, using a signal attribute associated with the response frame, a first SQV for the first frame; and responsive to the first SQV being below a reference SQV, cause the wireless device to select the first antenna as the active antenna for the first dwell period.

2. A wireless device comprising:

a first antenna and a second antenna; and one or more processing circuits to:

cause the wireless device to select a first antenna as an active antenna for a first dwell period;

determine a plurality of signal quality values (SQVs) associated with the first antenna, wherein each of at least a subset of the plurality of SQVs is determined for a respective frame of one or more frames transmitted or received by the wireless device during the first dwell period;

compute an aggregated SQV based on at least the plurality of SQVs; and cause the wireless device to select, responsive to expiration of the first dwell period and using the aggregated SQV, an active antenna for a second dwell period, wherein the active antenna for the second dwell period comprises at least one of the first antenna or a second antenna, wherein, to cause the wireless device to select the first antenna as the active antenna for the first dwell period, the one or more processing circuits are to:

cause the wireless device to transmit a first frame using an antenna different from the first antenna; and responsive to not receiving a response frame in response to the first frame within a timeout period, cause the wireless device to select the first antenna as the active antenna for the first dwell period.

3. A wireless device comprising:

a first antenna and a second antenna; and one or more processing circuits to:

cause the wireless device to select a first antenna as an active antenna for a first dwell period;

determine a plurality of signal quality values (SQVs) associated with the first antenna, wherein each of at least a subset of the plurality of SQVs is determined for a respective frame of one or more frames transmitted or received by the wireless device during the first dwell period;

compute an aggregated SQV based on at least the plurality of SQVs; and cause the wireless device to select, responsive to expiration of the first dwell period and using the aggregated SQV, an active antenna for a second dwell period, wherein the active antenna for the second dwell period comprises at least one of the first antenna or a second antenna, wherein, to cause the wireless device to select the first antenna as the active antenna for the first dwell period, the one or more processing circuits are to:

cause the wireless device to transmit a first frame using the first antenna;

cause the wireless device to receive, responsive to the first frame within a timeout period, a response frame using the first antenna;

determine, using a signal attribute associated with the response frame, a first SQV for the first frame; and responsive to the first SQV being at or above a reference SQV, cause the wireless device to select the first antenna as the active antenna for the first dwell period.

4. The wireless device of claim 3, wherein the aggregated SQV is further based on the first SQV.

5. The wireless device of claim 3, wherein to determine the first SQV, the one or more processing circuits are to determine at least one of:

a received signal strength indicator (RSSI) for the first frame, a signal-to-noise ratio (SNR) for the first frame, an exponential effective SNR mapping (EESM) for the first frame, a signal-to-interference-plus-noise ratio (SINR) for the first frame, a packet delivery ratio (PDR) for the first frame, or a bit error rate (BER) for the first frame.

6. A wireless device comprising:

a first antenna and a second antenna; and one or more processing circuits to:

cause the wireless device to select a first antenna as an active antenna for a first dwell period;

determine a plurality of signal quality values (SQVs) associated with the first antenna, wherein each of at least a subset of the plurality of SQVs is determined for a respective frame of one or more frames transmitted or received by the wireless device during the first dwell period;

compute an aggregated SQV based on at least the plurality of SQVs; and cause the wireless device to select, responsive to expiration of the first dwell period and using the aggregated SQV, an active antenna for a second dwell period, wherein the active antenna for the second dwell period comprises at least one of the first antenna or a second antenna, wherein, to cause the wireless device to select the active antenna for the second dwell period, the one or more processing circuits are to:

responsive to the aggregated SQV being below a reference SQV, cause the wireless device to select the second antenna as the active antenna for the second dwell period.

7. The wireless device of claim 6, further comprising:

a transceiver capable of being selectively coupled to at least the first antenna or the second antenna, wherein the one or more processing circuits are further to:

cause the transceiver to be decoupled from the first antenna and to be coupled to the second antenna.

8. The wireless device of claim 6, wherein the reference SQV characterizes a signal quality associated with the second antenna during one or more previous dwell periods in which the second antenna was selected as the active antenna.

9. A wireless device comprising:

a first antenna and a second antenna; and one or more processing circuits to:

cause the wireless device to select a first antenna as an active antenna for a first dwell period;

determine a plurality of signal quality values (SQVs) associated with the first antenna, wherein each of at least a subset of the plurality of SQVs is determined for a respective frame of one or more frames transmitted or received by the wireless device during the first dwell period;

compute an aggregated SQV based on at least the plurality of SQVs; and cause the wireless device to select, responsive to expiration of the first dwell period and using the aggregated SQV, an active antenna for a second dwell period, wherein the active antenna for the second dwell period comprises at least one of the first antenna or a second antenna, wherein, to cause the wireless device to select the active antenna for the second dwell period, the one or more processing circuits are to:

responsive to the aggregate SQV being at or above a reference SQV, cause the wireless device to select the first antenna as the active antenna for the second dwell period.

10. A communication device comprising:
a plurality of antennas comprising a first antenna and a second antenna;
a system-on-chip (SoC) comprising:
a transceiver capable of being selectively coupled to at least the first antenna or the second antenna;
a memory; and
one or more processing devices communicatively coupled to the transceiver and the memory, the one or more processing devices configured to:
cause the transceiver to select the first antenna as an active antenna for a first dwell period;
determine a plurality of signal quality values (SQVs) associated with the first antenna, wherein each of at least a subset of the plurality of SQVs is determined for a respective frame of one or more frames transmitted or received by the communication device during the first dwell period;
determine an aggregated SQV based on at least the plurality of SQVs;
responsive to expiration of the first dwell period and using the aggregated SQV, identify the second antenna as an active antenna for a second dwell time; and
cause the transceiver to decouple from the first antenna and couple to the second antenna
wherein identify the second antenna as the active antenna for the second dwell time is responsive to the aggregate SQV being at or above a reference SQV, wherein the reference SQV is based on at least one of:
a fixed threshold SQV, or
a historical SQV characterizing quality of wireless communications during one or more past dwell periods in which the second antenna was selected as the active antenna.

11. A method to operate a wireless device, the method comprising:
causing a wireless device to select a first antenna as an active antenna for a first dwell period;
determining a plurality of signal quality values (SQVs) associated with the first antenna, wherein each of at least a subset of the plurality of SQVs is determined for a respective frame of one or more frames transmitted or received by the wireless device during the first dwell period;
computing an aggregated SQV based on at least the plurality of SQVs; and
selecting, responsive to expiration of the first dwell period and using the aggregated SQV, an active antenna for a second dwell period, wherein the active antenna for the second dwell period comprises at least one of the first antenna or a second antenna, wherein causing the wireless device to select the first antenna as the active antenna for the first dwell period comprises:
transmitting a first frame using an antenna different from the first antenna;
receiving, responsive to the first frame within a timeout period, a response frame using the antenna different from the first antenna;
determining, using a signal attribute associated with the response frame, a first SQV for the first frame; and
responsive to the first SQV being below a reference SQV, causing the wireless device to select the first antenna as the active antenna for the first dwell period.

12. A method to operate a wireless device, the method comprising:
causing a wireless device to select a first antenna as an active antenna for a first dwell period;
determining a plurality of signal quality values (SQVs) associated with the first antenna, wherein each of at least a subset of the plurality of SQVs is determined for a respective frame of one or more frames transmitted or received by the wireless device during the first dwell period;
computing an aggregated SQV based on at least the plurality of SQVs; and
selecting, responsive to expiration of the first dwell period and using the aggregated SQV, an active antenna for a second dwell period, wherein the active antenna for the second dwell period comprises at least one of the first antenna or a second antenna,
wherein causing the wireless device to select the first antenna as the active antenna for the first dwell period comprises:
transmitting a first frame using an antenna different from the first antenna; and
responsive to not receiving a response frame in response to the first frame within a timeout period, causing the wireless device to select the first antenna as the active antenna for the first dwell period.

13. A method to operate a wireless device, the method comprising:
causing a wireless device to select a first antenna as an active antenna for a first dwell period;
determining a plurality of signal quality values (SQVs) associated with the first antenna, wherein each of at least a subset of the plurality of SQVs is determined for a respective frame of one or more frames transmitted or received by the wireless device during the first dwell period;
computing an aggregated SQV based on at least the plurality of SQVs; and
selecting, responsive to expiration of the first dwell period and using the aggregated SQV, an active antenna for a second dwell period, wherein the active antenna for the second dwell period comprises at least one of the first antenna or a second antenna,
wherein causing the wireless device to select the first antenna as the active antenna for the first dwell period comprises:
transmitting a first frame using the first antenna;
receiving, responsive to the first frame within a timeout period, a response frame using the first antenna;
determining, using a signal attribute associated with the response frame, a first SQV for the first frame; and responsive to the first SQV being at or above a reference SQV, causing the wireless device to select the first antenna as the active antenna for the first dwell period.

14. A method to operate a wireless device, the method comprising:
   causing a wireless device to select a first antenna as an active antenna for a first dwell period;
   determining a plurality of signal quality values (SQVs) associated with the first antenna, wherein each of at least a subset of the plurality of SQVs is determined for a respective frame of one or more frames transmitted or received by the wireless device during the first dwell period;
   computing an aggregated SQV based on at least the plurality of SQVs; and
   selecting, responsive to expiration of the first dwell period and using the aggregated SQV, an active antenna for a second dwell period, wherein the active antenna for the second dwell period comprises at least one of the first antenna or a second antenna,
   wherein selecting the active antenna for the second dwell period comprises:
      responsive to the aggregated SQV being below a reference SQV, causing the wireless device to select the second antenna as the active antenna for the second dwell period.

15. A method to operate a wireless device, the method comprising:
   causing a wireless device to select a first antenna as an active antenna for a first dwell period;
   determining a plurality of signal quality values (SQVs) associated with the first antenna, wherein each of at least a subset of the plurality of SQVs is determined for a respective frame of one or more frames transmitted or received by the wireless device during the first dwell period;
   computing an aggregated SQV based on at least the plurality of SQVs; and
   selecting, responsive to expiration of the first dwell period and using the aggregated SQV, an active antenna for a second dwell period, wherein the active antenna for the second dwell period comprises at least one of the first antenna or a second antenna,
   wherein selecting the active antenna for the second dwell period comprises:
      responsive to the aggregate SQV being at or above a reference SQV, causing the wireless device to select the first antenna as the active antenna for the second dwell period,
   wherein the reference SQV is based on at least one of:
      a fixed threshold SQV, or
      a historical SQV characterizing quality of wireless communications during one or more past dwell periods in which the second antenna was selected as the active antenna.

* * * * *